(12) United States Patent
Huenecke (10) Patent No.: US 6,513,761 B2
(45) Date of Patent: Feb. 4, 2003

(54) METHOD AND APPARATUS FOR REDUCING TRAILING VORTICES IN THE WAKE OF AN AIRCRAFT

(75) Inventor: Klaus Huenecke, Weye (DE)

(73) Assignee: Airbus Deutschland GmbH, Hamburg (DE)

( * ) Notice: Subject to any disclaimer, the term of this patent is extended or adjusted under 35 U.S.C. 154(b) by 0 days.

(21) Appl. No.: 09/770,763

(22) Filed: Jan. 25, 2001

(65) Prior Publication Data

US 2001/0030264 A1 Oct. 18, 2001

(30) Foreign Application Priority Data

Apr. 13, 2000  (DE) .......................................... 100 18 389

(51) Int. Cl.$^7$ .............................................. B64C 23/06
(52) U.S. Cl. ........................ 244/199; 244/201; 244/215
(58) Field of Search ................................ 244/199, 201, 244/213, 215, 217

(56) References Cited

U.S. PATENT DOCUMENTS

| | | | |
|---|---|---|---|
| 2,925,232 A | * 2/1960 | Murray et al. ................ 244/42 |
| 3,578,264 A | 5/1971 | Kuethe | |
| 3,596,854 A | 8/1971 | Haney, Jr. | |
| 3,881,669 A | * 5/1975 | Lessen ...................... 244/40 R |
| 3,997,132 A | * 12/1976 | Erwin ....................... 244/40 R |
| 4,039,161 A | 8/1977 | Bauer | |
| 4,591,113 A | * 5/1986 | Mabey ..................... 244/76 C |
| 4,739,957 A | * 4/1988 | Vess et al. .................. 244/199 |
| 4,836,473 A | 6/1989 | Aulehla et al. | |
| 5,058,837 A | * 10/1991 | Wheeler ..................... 244/199 |
| 5,253,828 A | 10/1993 | Cox | |
| 5,749,546 A | 5/1998 | Blackner et al. | |
| 5,772,155 A | 6/1998 | Nowak | |
| 5,788,191 A | * 8/1998 | Wake et al. ................. 244/199 |
| 5,983,944 A | 11/1999 | Niv | |
| 6,042,059 A | * 3/2000 | Bilanin ....................... 244/199 |
| 6,082,679 A | * 7/2000 | Crouch et al. ............... 244/199 |
| 6,152,404 A | 11/2000 | Flaig et al. | |

FOREIGN PATENT DOCUMENTS

| | | | | |
|---|---|---|---|---|
| DE | 3521329 | 12/1986 | | |
| DE | 19909190 | 9/2000 | | |
| EP | 0315563 | 5/1989 | | |
| GB | 2051706 | 1/1981 | | |
| JP | 401285492 A | * 11/1989 | .................. 244/91 |
| WO | WO90/11929 | 10/1990 | | |
| WO | WO99/00297 | 1/1999 | | |

* cited by examiner

Primary Examiner—Michael J. Carone
Assistant Examiner—Gabriel S Sukman
(74) Attorney, Agent, or Firm—W. F. Fasse; W. G. Fasse

(57) ABSTRACT

Harmful trailing vortices downstream of an aircraft wing are at least partly dissipated by a respective counteracting vortex for each trailing vortex at each wing. An auxiliary counteracting vortex generating flap, preferably in the form of at least part of a delta wing, is journaled to the respective wing in the area of the outer end of a landing flap. The counteracting vortex is imposed on the respective trailing vortex, whereby the trailing vortex is caused to vibrate. The vibration dissipates the trailing vortex at least partially.

17 Claims, 5 Drawing Sheets

FIG.12

METHOD AND APPARATUS FOR REDUCING TRAILING VORTICES IN THE WAKE OF AN AIRCRAFT

CROSS-REFERENCE TO RELATED APPLICATION

This application is related to copending U.S. Ser. No. 09/841,699, filed Apr. 24, 2001, for: Noise Reducing Vortex Generators on Aircraft Wina Control Surfaces.

PRIORITY CLAIM

This application is based on and claims the priority under 35 U.S.C. §119 of German Patent Application 100 18 389.1, filed on Apr. 13, 2000, the entire disclosure of which is incorporated herein by reference.

FIELD OF THE INVENTION

The invention relates to an apparatus and to a method for reducing so-called trailing vortices that are generated by the high performance lift producing systems of the aircraft wings particularly the landing flaps.

BACKGROUND INFORMATION

Conventionally, the wings of aircraft, particular large subsonic transport aircraft are equipped with high performance lift producing systems such as landing flaps and their drives for generating the required lift, particularly during slow speed flight, for example during landing. Speeds above ground of about 200 miles per hour or less are referred to as slow speeds, that may vary depending on the type of aircraft. As a rule, such high performance lift producing systems comprise slats, landing flaps and their drives. When a wing produces lift, harmful vortices are generated in the wake of the wings, particularly downstream of the landing flaps. Such harmful vortices are referred to herein as trailing vortices. More specifically, a trailing vortex is formed at the outer end of the respective landing flaps away from the central longitudinal axis of the aircraft. Further vortices are generated in the area of the wing tips. These tip vortices are also referred to as trailing vortices. All trailing vortices form a vortex system in which each individual vortex rotates about its own axis while additionally rotating within the vortex system, whereby the entire vortex system follows a spiral motion that is entrained into the air flow along the aircraft.

The trailing vortices produced in the wake of large aircraft pose a danger for any following aircraft, particularly in the dense flight patterns prevailing in landing approach paths. Regulation safety spacings between two consecutive aircraft preparing for landing reduce the danger, but have the drawback of limiting the capacity of a landing strip. This capacity, expressed as a number of aircraft that can land on the same landing strip in a specified time, is reduced even more for large and heavier aircraft which require ever larger safety spacings. The heavier or larger an aircraft gets the larger is the safety spacing required for maintaining the regulation flight safety, particularly since the vortex intensity of the trailing vortices depends on the weight of the aircraft. The ever increasing use of large capacity aircraft, for example the A3XX and the ever growing air traffic, however, require a reduction in the so far generously allocated safety spacings between two landing aircraft. Thus, efforts have been made in the design of such large capacity aircraft to provide aircraft features which are capable of reducing the intensity of the trailing vortices and which preferably cause their rapid dissipation.

International Publication WO 99/00297 (Croucii et al.) shows that for some time now efforts have been made to reduce the trailing vortices or their harmful effects. For this purpose, the aileron (68) and spoiler flaps (70) are continuously operated to swing back and forth. The aileron motions and the flap motions are computer controlled in response to a plurality of criteria for exciting the trailing vortices to perform cross vibrations which are intended to rapidly dissipate the trailing vortices. However, the just described conventional features do not avoid the formation of large scale vortices downstream of the aircraft, yet do require an involved computer control program and system.

Another approach is disclosed in British Patent GB 2,051, 706 A1 in which vortex reducing vanes (9) are secured to the end of the lift increasing landing flaps (2) or to the fixed wing structure adjacent the flap ends or to booms (10) which in turn are secured to the flap ends for reducing the formation of trailing vortices to thereby also reduce aircraft drag. However, this conventional device due to its position and shape is not capable of producing a controlled interference or counter vortex for dissipating a respective trailing vortex.

OBJECTS OF THE INVENTION

In view of the above it is the aim of the invention to achieve the following objects singly or in combination:

to provide a method and apparatus for reducing trailing vortices in the wake of an aircraft, particularly in the wing wake of an aircraft during slow flight for example during landing;

to provide a method and apparatus which assures a rapid dissipation of trailing vortices so that the formation of large scale vortices downstream of the aircraft is also reduced or even avoided;

to provide aircraft features that permit reducing the safety spacings between two aircraft in a landing approach while maintaining the required safety; and to reduce the trailing vortices by generating counteracting or interfering vortices in the critical locations where the trailing vortices are unavoidably generated at the wing especially by the landing flaps.

SUMMARY OF THE INVENTION

According to the invention an apparatus for reducing trailing vortices generated in an aircraft by wing components including lift producing trailing edge landing flaps of the aircraft, is characterized by at least one controllable vortex generator secured to a mounting area of each wing at an outer end of an extended trailing edge landing flap for generating a controlled counteracting vortex for a respective trailing vortex downstream of each wing. Preferably, the at least one controllable vortex generator is so positioned that the counteracting vortex causes a respective trailing vortex to vibrate, thereby dissipating the respective trailing vortex at least partially. The vibrations of the trailing vortex preferably extend perpendicularly to a central longitudinal aircraft axis. At least one controllable vortex generator is provided for each trailing edge landing flap.

The above mentioned mounting area on the fixed wing of the aircraft is bounded in the flight direction by a line or point positioned downstream of the wing leading edge at 60% of the respective clean wing section which is the wing section when flaps and slats are retracted or not extended. The wing section is measured in the flight direction at the location of the present controllable vortex generator. The mounting area is further bounded in the direction opposite to the flight direction by a line or point positioned at 80% of the wing chord. In the spanwise wing direction the mounting area has a length, that is centered for example on an outer edge of a respective landing flap and corresponds to 10% of one half of the aircraft's span in either direction away from said outer edge.

The controllable vortex generators in the form of auxiliary flaps are secured with their forward edge to the fixed wing portion in the above defined mounting area and are operated, for example by conventional spoiler drives for extending and retracting the auxiliary vortex generator flap.

By rapidly dissipating the trailing vortices, the invention reduces or even avoids the formation of dangerous vortices downstream of the aircraft during slow flight especially during landing approach flight, whereby air traffic safety is generally increased. A further advantage of the invention is seen in that the regulation safety spacings between two landing aircraft can be reduced, whereby the capacity of a landing strip is increased, thereby accommodating the growing requirements of modern air traffic. The teachings of the invention are particularly suitable for use in large aircraft in which conventionally the formation of trailing vortices has posed a serious problem for air traffic. Moreover the present teachings provide a simple yet very efficient solution of the stated problems.

In a preferred embodiment the present vortex generator is a simple, small auxiliary flap which is recessed into the wing when it is not used. It has been found that the most efficient position of the auxiliary flap is next to an outer end of an aircraft landing flap in the above defined mounting area. The auxiliary flap is most effective when it has an angle of attack below 30° relative to the top surface of the aircraft wing, preferably within the range of 12 to 25°.

Several configurations for the auxiliary counter vortex generating flaps are disclosed, whereby in each instance the counter vortex is generated by the leading edge of the auxiliary flap, and the leading edge or edges of the auxiliary flap have a sweepback configuration with a sweepback angle of, for example 60°.

During landing or slow flight the present auxiliary counter vortex generating flap may assume a stationary extended position or it may be operated repeatedly between an extended and retracted position, whereby preferably the auxiliary flap on one wing is extended while the auxiliary flap of the other wing is retracted and vice versa. Alternatively both flaps are worked in synchronism, whereby both flaps are extended and retracted simultaneously during slow flight.

The method according to the invention is characterized in that a counter vortex is generated in said mounting area and this counter or control vortex is injected into the trailing vortex preferably at the outer end of the respective landing flaps, whereby the injection of the counter vortex causes the trailing vortex to vibrate relative to its propagation direction to thereby rapidly and effectively dissipate the trailing vortex.

The present auxiliary flaps are maintained in a recessed position during ordinary flight and are lifted during landing or slow flight into either a stationary position or they are dynamically operated either symmetrically or unsymmetrically on both wings as described above.

BRIEF DESCRIPTION OF THE DRAWINGS

In order that the invention may be clearly understood, it will now be described in connection with example embodiments, with reference to the accompanying drawings, wherein.

DETAILED DESCRIPTION OF PREFERRED EXAMPLE EMBODIMENTS AND OF THE BEST MODE OF THE INVENTION

Figures 1, 10:
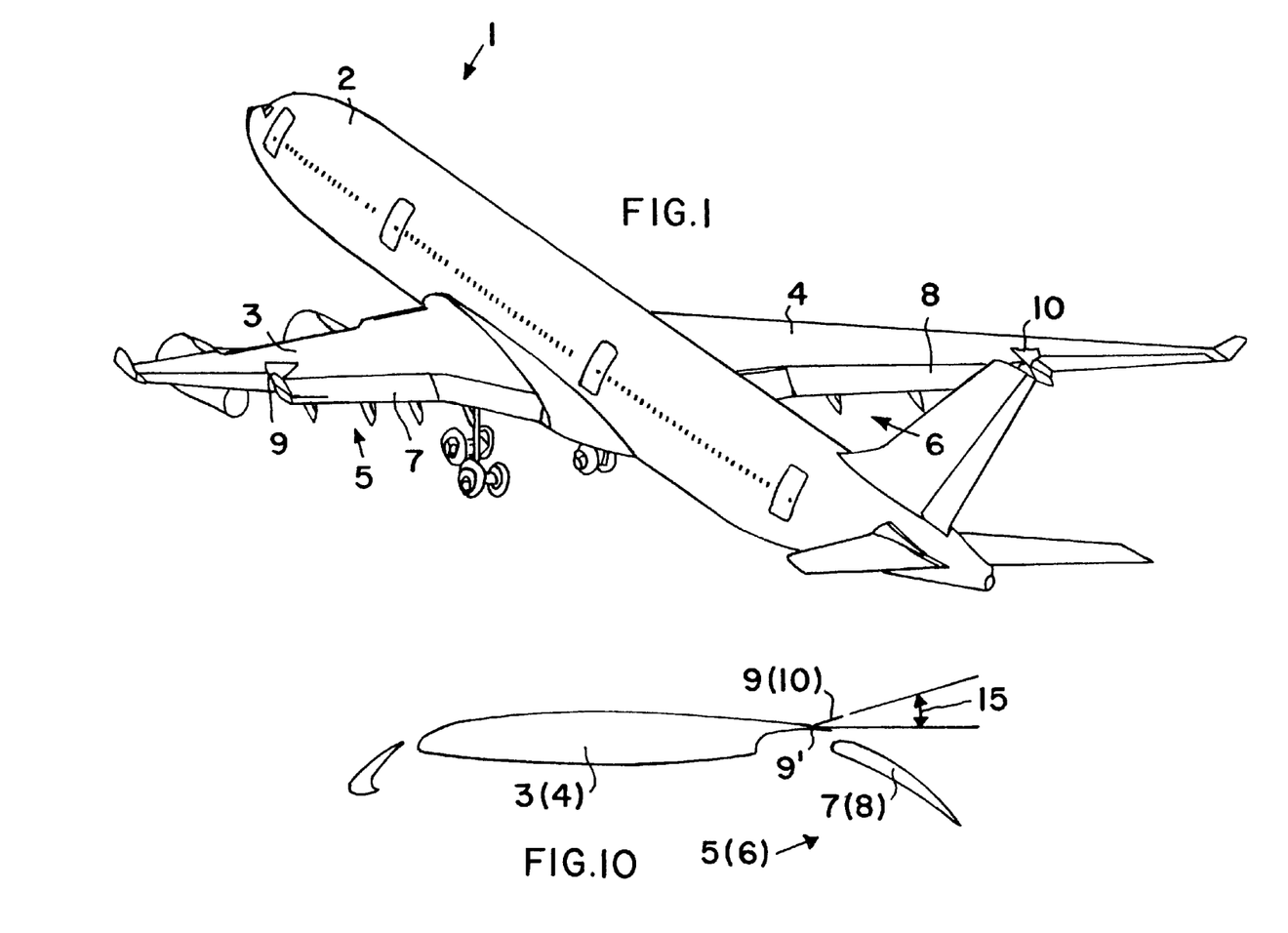
FIG. 1 is a perspective view of an aircraft equipped with at least one vortex generator for each wing for reducing trailing vortices.
FIG. 10 is a sectional view through a wing illustrating the position and angle of attack of a controllable vortex generator according to the invention.

FIG. 1 shows a perspective view of an aircraft 1 of a large scale, subsonic type having a body 2 constructed for transporting passengers. A left wing 3 and a right wing 4 are conventionally secured to the aircraft body 2. According to the invention the wing 3 is equipped with a controllable vortex generator 9 for producing a counter vortex for reducing a trailing vortex generated by a landing flap 7. A further controllable vortex generator 10 for producing a counter vortex is provided on the wing 4 at the outer end of a landing flap 8. The landing flap 7 with its accessories, not shown in detail, forms a high performance lift generating system 5. The landing flap 8 with its accessories not shown in detail forms a high performance lift producing system 6. The controllable vortex generators 9 and 10 are so positioned and constructed according to the invention that trailing vortices generated for example by the high performance landing flaps 7 and 8 will be at least reduced or rapidly dissipated. The controllable vortex generators 9 and 10 are activated during slow flight speeds above ground, for example during landing. An above ground speed of about 200 mph or less is considered to be a slow speed in this context.

Figure 2:
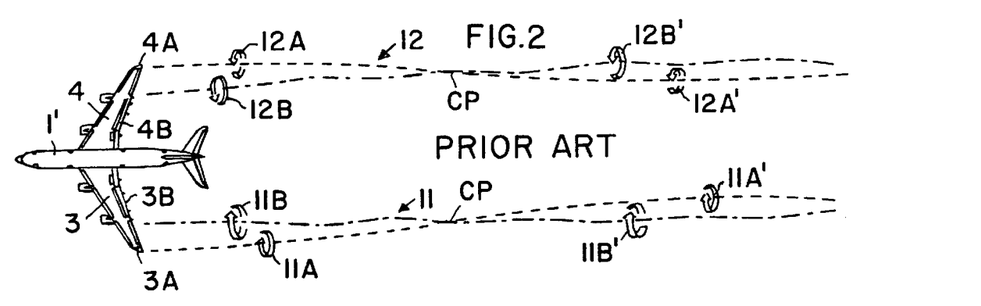
FIG. 2 is a top plan view of a conventional aircraft and the trailing vortices downstream of the aircraft wings.

FIG. 2 shows a conventional aircraft 1' without the vortex generators according to the invention. Downstream of the wing 3 two types of vortices 11 are produced, namely a tip vortex 11A shown by a dashed line and a respective rotational arrow and a flap vortex 11B shown by a dash-dotted line and its respective rotational arrow. Similarly, two types of vortices 12 are generated downstream of the wing 4, namely a tip vortex 12A shown by a dashed line and its respective rotational arrow and a flap vortex 12B shown by a dash-dotted line and its respective rotational arrow. As mentioned, the tip vortex 12A originates at the wing tip 4A and the tip vortex 11A originates at the wing tip 3A. The flap vortices 11B and 12B originate at the outer left flap end 7A and at the outer flap end 8A from numerous smaller vortices that are generated along the trailing edges 3B and 4B of the extended flaps 7 and 8. The tip vortex 11A and the flap vortex 11B while rotating about themselves as indicated by the arrows 11A' and 11B', at the same time rotate about each other. Both vortices eventually merge into one vortex further downstream. Similarly, the tip vortex 12A and the flap vortex 12B are rotating about themselves in rotational directions 12A' and 12B'. Simultaneously, the vortices 12A and 12B rotate about each other and eventually also merge into one vortex further downstream. The rotational directions 12A' and 12B' are opposite to the rotational directions 11A' and 11B'. The final result of these rotations is typically a single hazardous pair of counter rotating vortices with a duration of two or more minutes.

The worst location where these harmful vortices are generated is at the outer ends 7A and 8A of each landing flaps 7 and 8 as is shown more clearly in FIG. 6 to be described below.

Figures 3, 4:
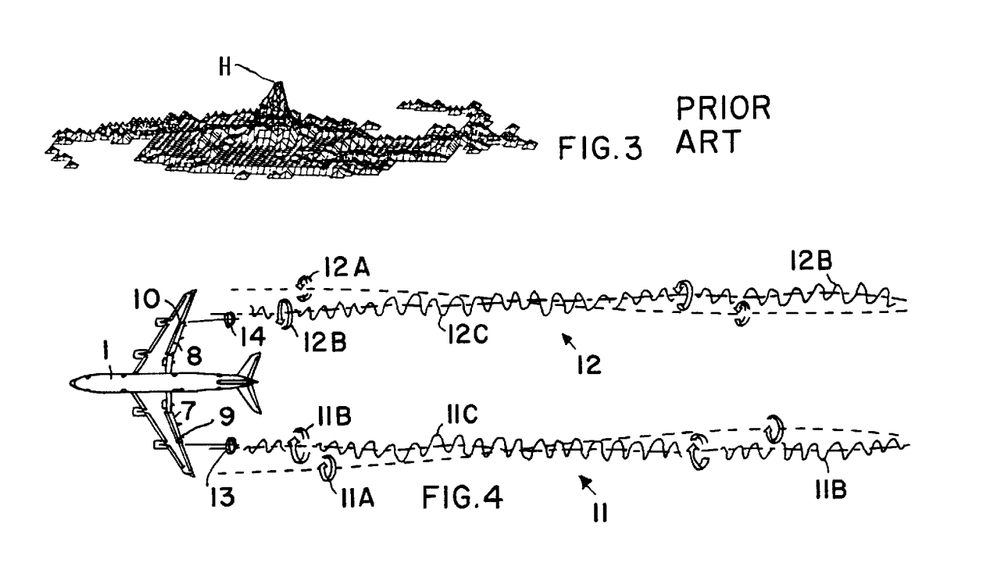
FIG. 3 illustrates a computer generated pattern or profile of a conventional trailing vortex downstream of an aircraft wing as shown in FIG. 2.
FIG. 4 is a view similar to that of FIG. 2, however, showing an aircraft equipped with controllable vortex generators according to the invention positioned for generating counter vortices which cause the respective trailing vortices to vibrate for at least partly dissipating the trailing vortices.

FIG. 3 shows a computer aided illustration of a conventional vortex pattern or profile downstream of a conventional aircraft 1' as shown in FIG. 2.

FIG. 4 shows an illustration similar to that of FIG. 2, however showing the aircraft 1 with the controllable vortex generators 9 and 10 according to the invention. These vortex generators 9 and 10 are mounted in a mounting area MA shown in FIGS. 12 near the outer ends 7A, 8A of the landing flaps 7 and 8, respectively. The controllable vortex generator 9 generates a counter vortex 13. The vortex generator 10 generates a counter vortex 14.

Figures 6, 11:
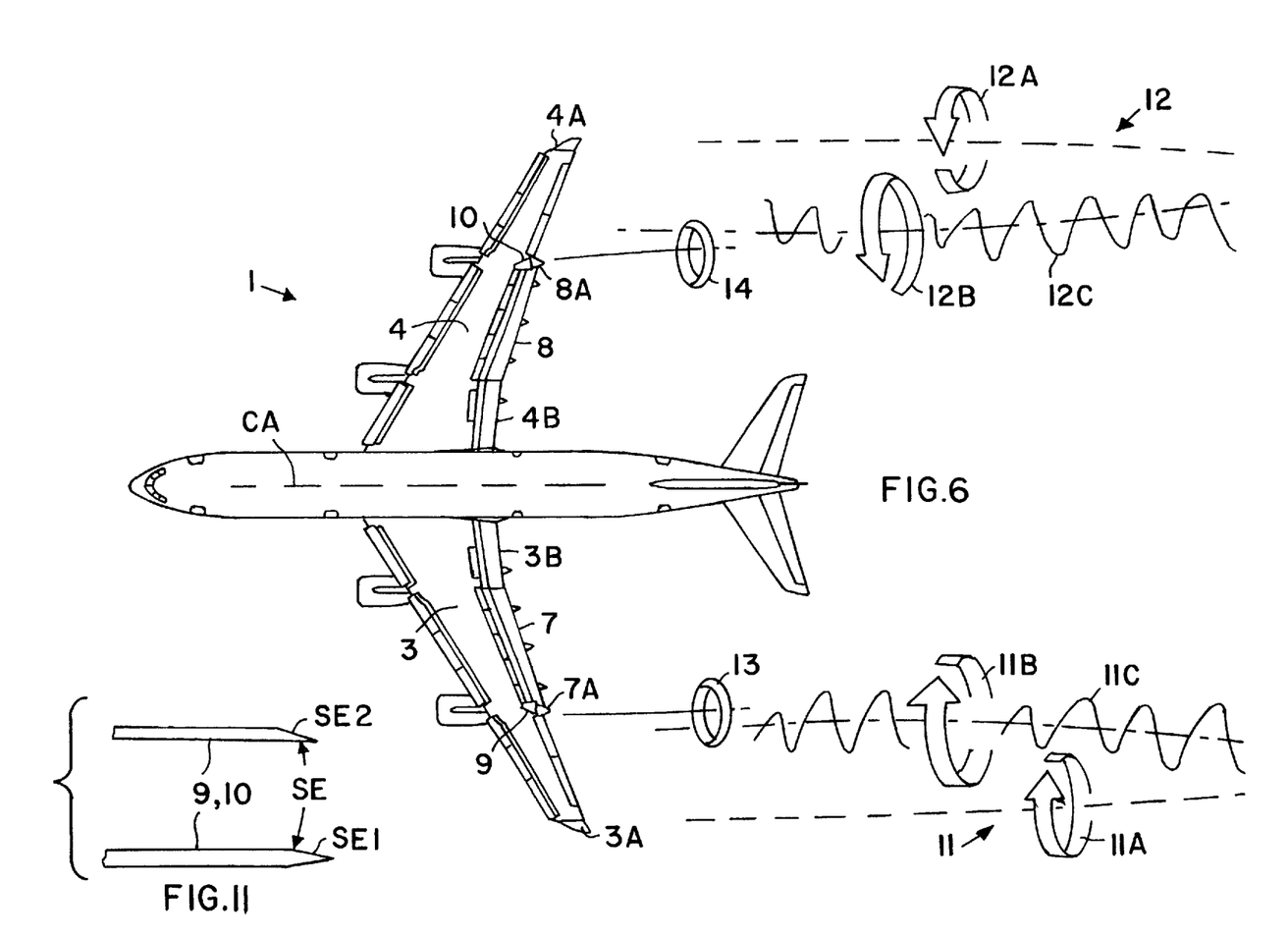
FIG. 6 is an enlarged view of the left-hand portion of FIG. 4.
FIG. 11 shows a section through a controllable vortex generator flap having at least one sharpened edge.

These counter vortices 13 and 14 are injected into the respective flap vortices 11B and 12B, whereby these flap vortices 11B and 12B are caused to vibrate as indicated by the zig-zag lines 11C and 12C best seen in FIGS. 4 and 6. These vibrations 11C and 12C counteract the flap vortices 11B and 12B respectively, thereby dissipating these vortices.

Figure 5:
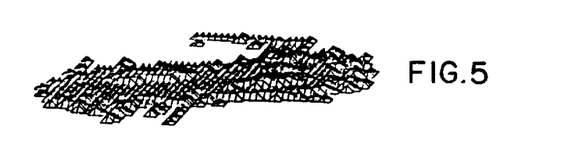
FIG. 5 is a view similar to that of FIG. 3, however illustrating a substantially reduced trailing vortex pattern or profile according to the invention.

FIG. 5 shows a computer generated pattern or profile of the partially dissipated harmful trailing vortices. It is noted that the profile shown in FIG. 5 is not only smaller than the conventional profile in FIG. 3, but also does not show the pronounced vorticity peak H that is visible in FIG. 3. The vorticity peak H generated by the aircraft, especially with the landing flaps extended, is a measure of vortex strength and vortex duration.

FIG. 6 shows on an enlarged scale what is also seen in FIG. 4. A heavy dash-dotted line with a respective rotational arrow 11B, 12B illustrates the trailing vortex generated, particularly at the outer end 7A and 8A of the respective landing flaps 7 and 8. The heavy line indicates that the vortex intensity of the flap trailing vortices 11B and 12B are substantially stronger than the vortex intensity of the tip vortices 11A and 12A shown by respective rotational arrows and a dashed line. As mentioned, according to the invention, controllable vortex generators 9 and 10 are so positioned in a mounting area MA near the outer ends 7A and 8A of the respective landing flaps 7 and 8. It has been found that this position for the counter vortex generators 9 and 10 is most efficient in providing counter vortices 13 and 14 that are injected into the respective flap vortices 12B and 11B to thereby cause these flap vortices 11B and 12B to vibrate as indicated by the zig-zag lines 11C and 12C, whereby the intensity of the respective flap vortices 11B and 12B is rapidly diminished or dissipated. A dissipation of the tip vortices 11A and 12A may be accomplished in the same manner, but is normally not necessary since the tip vortices generally do not have an intensity that rises to dangerous levels.

The controllable vortex generators 9 and 10 are preferably flaps or rather auxiliary flaps that are so positioned that the respective counter vortices 13 and 14 already interfere with the formation of the flap vortices 11B and 12B. To the extent that the trailing flap vortices do occur, the injected vibrations quickly dissipate the intensity of these trailing flap vortices.

Referring to FIG. 10, the operation of the counter vortices 13 and 14 will now be described. The controllable vortex generators in the form of auxiliary flaps 9, 10 are secured with their front end, which is not necessarily their leading edge, to a fixed portion of the respective wing 3, 4 in a mounting area MA shown in FIG. 12. A mounting 9' such as a journal 9' or any other conventional mounting for the auxiliary flaps 9, 10 is positioned just upstream of the outer end 7A, 8A of the respective landing flap 7, 8 of the high performance lift producing systems 5, 6.

As shown in FIG. 10 the controllable auxiliary flaps 9, 10 are adjustable within an angular range 15. This angular range is 30° or less, preferably 12 to 25°. These controllable auxiliary flaps or vortex generators 9, 10 produce at their leading edge on the suction side of the wing a controlled counter vortex, relative to the leading edge of the respective landing flap 7, 8. The counter vortex is energized by separation flow of the respective leading edge of the auxiliary flap or device. This controlled counter vortex separates from the auxiliary vortex generator flaps 9 or 10 at the respective auxiliary flap trailing edge and is thereby injected as a free flowing counter vortex 13, 14 into the respective flap trailing vortex 11B or 12B which is generated at the outer ends 7A, 8A of the respective landing flap 7, 8. The trailing vortex is generated by a convergence of the vortex intensity toward the landing flap ends of an unstable vortex layer that flows off along the trailing edge of each landing flap 7, 8. The effect of the counter vortices 13 and 14 on the respective trailing vortices is so intense that the trailing vortices 11B and 12B are forced into crosswise oscillations, whereby the concentration or intensity of the trailing vortices is substantially diminished or dissipated. Due to these crosswise oscillations the trailing vortices 11B, 12B lose intensity, whereby particularly the maximum vortex intensity in the core of the resulting vortex is substantially reduced as shown in FIG. 5. FIG. 5 shows, for example the trailing vortex 12. Due to the counter vortex 14 the trailing vortex 12 oscillates intensively, whereby its vortex intensity is reduced.

Such a disturbed trailing vortex 12 dissipates rapidly. FIG. 3 on the other hand, shows the vortex intensity of a trailing vortex of an aircraft 1' without the vortex generating flaps 9, 10 according to the invention. The trailing vortex of a conventional aircraft 1' shows the above mentioned central vorticity peak H. The larger this vorticity peak H is, the greater is the intensity of the respective trailing vortex. Thus, FIG. 5 shows that the auxiliary vortex generating flaps 9 and 10 of the invention substantially reduce the vortex intensity of the trailing vortices.

Figure 7:
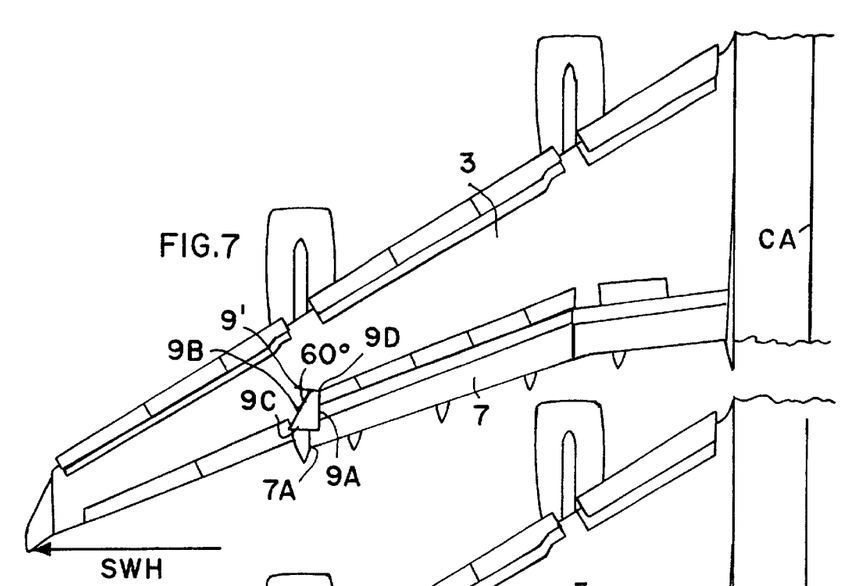
FIGS. 7, 8 and 9 show several vortex generator configurations in the form of flaps positioned in a mounting area next to the outer end of a respective landing flap.
Figure 8:
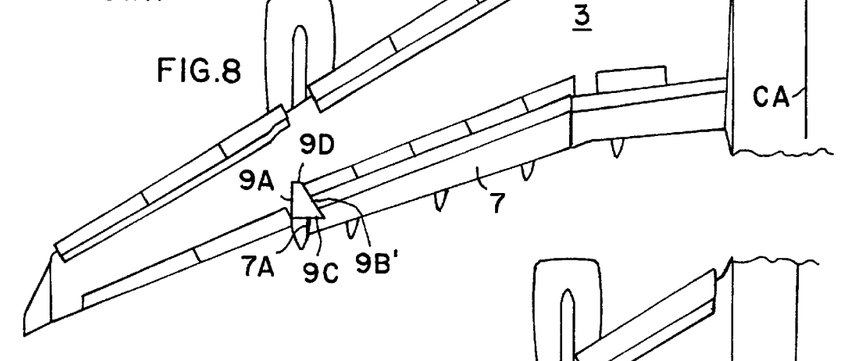
Figure 9:
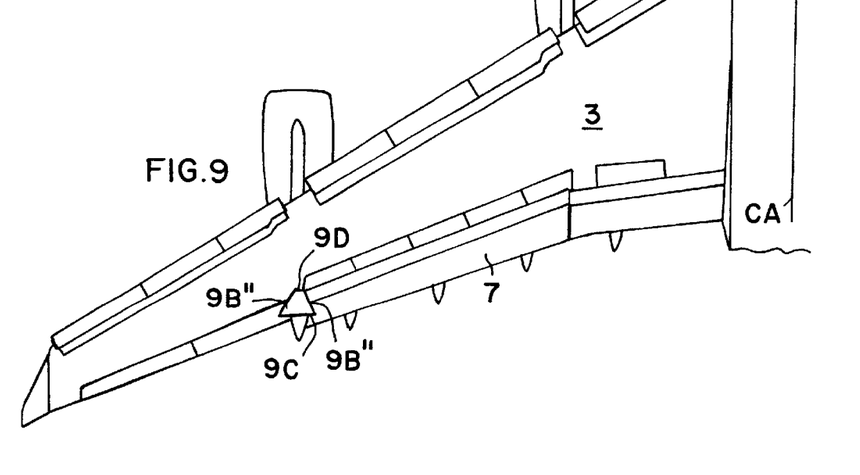

FIGS. 7, 8 and 9 show several embodiments of vortex generator flaps according to the invention which have relatively small dimensions compared, for example to the high efficiency landing flaps 7 and 8. In all embodiments the flaps 9, 10 are mounted with their shortest dimension front end 9D to the mounting area MA to be described below with reference to FIG. 12. The forward facing front end 9D is operatively secured, for example hinged, to a fixed portion of the wing 3, 4 in such a way that the shortest dimension extends preferably perpendicularly to the central axis CA of the aircraft. The auxiliary controllable flaps 9, 10 have at least a half delta wing configuration. FIG. 7 shows a left-hand half delta wing configuration. FIG. 8 shows a right-hand half delta wing configuration. FIG. 9 shows a full delta wing configuration. The sweep angle of the auxiliary flap or device is preferably 60° in all embodiments. The leading edge 9B in FIG. 7 sweeps to the left. The leading edge 9B' in FIG. 8 sweeps to the right. In FIG. 9 the sweptback edges 9B" sweep to the right and left. The flap edges 9A in FIGS. 7 and 8 are straight edges extending in the flight direction.

In FIG. 9, due to the full delta wing configuration of the auxiliary flaps 9, 10 oppositely rotating counter vortices are generated forming a pair of counter vortices. These counter vortices are injected in a controlled manner into the generation of the respective trailing vortex.

Referring to FIG. 11, shown on the sheet with FIG. 6, the swept leading edges of the auxiliary flaps 9, 10 are sharpened edges SE which enforce a proper flow separation of the counter vortices 13 and 14 from the respective auxiliary flap. The sharpened edge SE may have a double taper SE1 or a single taper SE2. In all instances the sweepback edges 9B, 9B', 9B" of the auxiliary flaps 9, 10 are preferably straight. However, these sweptback edges 9B, 9B', and 9B" may also have a wavy edge configuration similar to the wings of a supersonic aircraft such as the "Concorde". The trailing edge 9C of each auxiliary flap is preferably straight and extends preferably perpendicularly to the flight direction thus perpendicularly to the central axis CA of the aircraft.

With regard to FIG. 10 it should be noted that the auxiliary flaps 9 and 10 are maintained in a recessed position in the aircraft wing during normal or cruising flight and these flaps are extended only during slow flight, particularly during landing. It has been found that an angle of attack 15 of the auxiliary flap which exceeds 30° may lead to uncontrolled flow separations which is undesirable for the generation or formation of a controlled counter vortex 13, 14. The mounting and drive at the journal 9' is conventional and hence not shown in detail. Drives for extending and retracting conventional spoilers are suitable for the present purposes.

Figure 12:
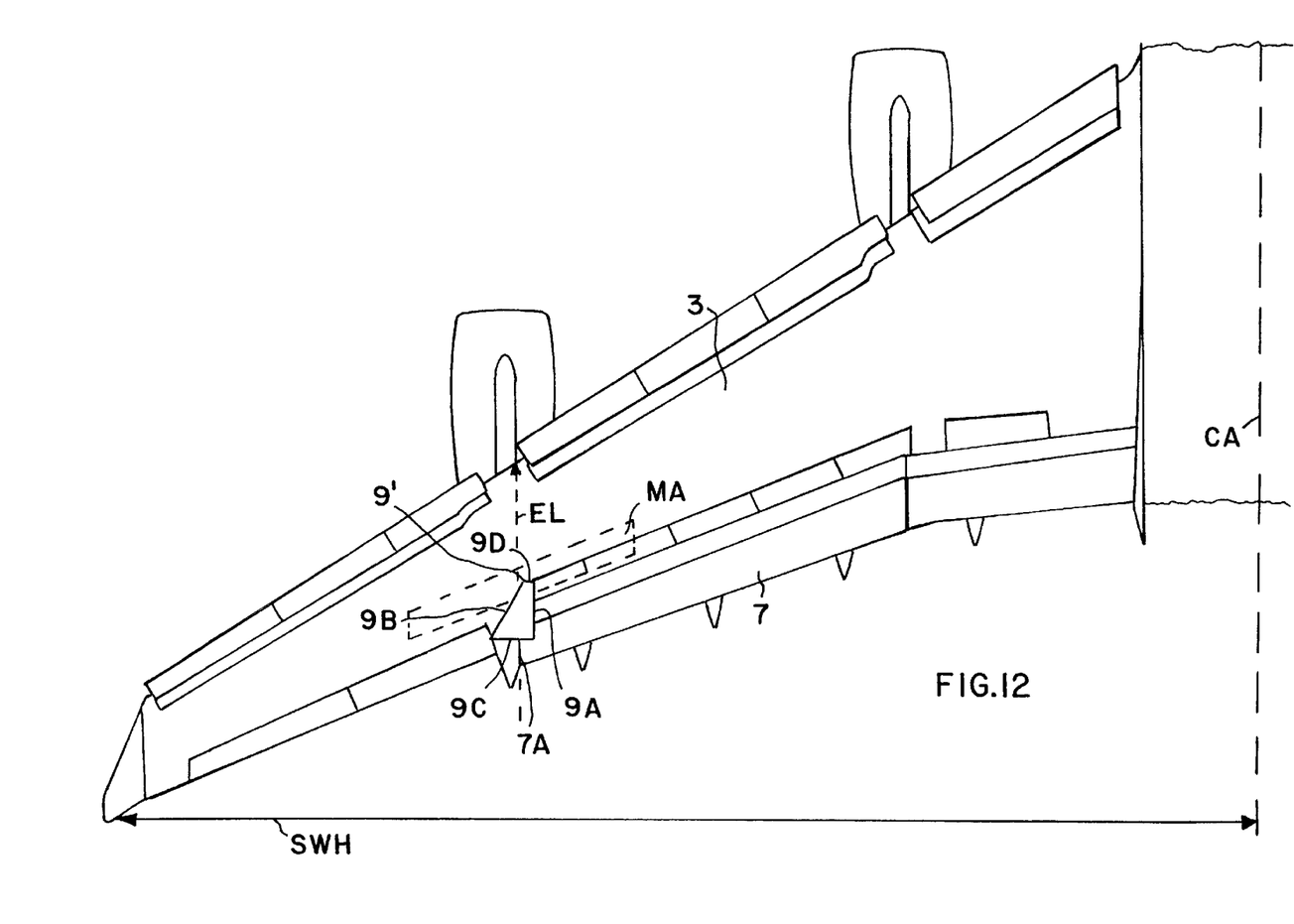
FIG. 12 is an enlarged view of FIG. 7 illustrating a mounting area on the fixed wing portion of the aircraft wing wherein the front edge of a vortex generator flap is preferably mounted to the fixed wing portion.

Referring to FIG. 12 a mounting area MA for the front end 9D or rather the mounting journal or hinge 9' is illustrated on top of the wing 3 by dashed lines. The mounting area MA has a width in the flight direction that corresponds to 60% to 80% of the width of the wing section or chord line EL of the respective clean wing section as defined above. The wing section or chord line EL is measured in the flight direction at the outer end 7A, 8A of the respective retracted landing flaps 7, 8 between the leading edge and the trailing edge of the clean wing section, i.e. with slats and flaps retracted. The 60% length extends from the leading edge of the wing to the upper dashed line of the mounting area MA. The 80% length extends from the leading edge of the wing to the lower dashed line of the mounting area MA. The extension or length of the mounting area MA in the direction of the wing is measured to the right and/or left of the wing section or chord line EL at the outer end 7A of the flap 7 or 8A of the flap 8. This length of the mounting area MA in either direction away from the chord line EL in the wing direction is preferably 10% of one half of the span width of the aircraft. Thus, the total length of the mounting area MA in the wing direction is 20% of one half of the span width of the aircraft, namely the sum of the 10% portion extending from the chord line EL to the fuselage and the 10% portion extending from the chord line EL toward a respective wing tip. A line SWH measured from the wing tip to the central aircraft axis CA represents this half span width of the aircraft.

In order that the auxiliary flaps 9, 10 are effective during slow flight, such as during landing, these flaps must be tilted into the flow along the suction side or top side of the respective wing. By arranging the forward end 9D slightly upstream of the respective flap end 7A, 8A, a controlled small vortex 13, 14 is generated along the sweptback edge 9B, 9B', 9B" which upon separating from the auxiliary flap is a highly turbulent vortex flow that is injected at the point where the trailing vortex is generated, namely at the outer end 7A, 8A of the respective landing flap, whereby the trailing vortex is excited to oscillations or vibrations that quickly dissipate the intensity of the trailing vortices 11 and 12. More specifically, the controlled high intensity counter vortex 13, 14 suppresses the concentration of the trailing vortices.

The present flaps 9, 10 can be operated into a stationary extended position during slow flight or they can be operated dynamically by repeatedly extending these auxiliary flaps 9, 10 into the airstream during slow flight. Moreover, the flaps on the wing 3 and the flaps on the wing 4 may be operated in synchronism, whereby both flaps are extended and retracted simultaneously, or they may be operated in an asymmetric manner, whereby one flap is extended while the other is retracted and vice versa.

In both instances, namely when the auxiliary flaps 9, 10 are operated synchronously and when they are operated asymmetrically, longitudinal vibrations or asymmetric counter vortices are generated which all are suitable for accelerating the dissipating of the trailing vortices.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. An apparatus for reducing trailing flap vortices (11, 12) of an aircraft generated by wing components including lift producing trailing edge landing flaps (7, 8) of aircraft wings (3, 4) having a given span width, said landing flaps each having an outer flap end (7A, 8A) relative to a central longitudinal aircraft axis (CA) at which outer flap end said trailing flap vortices are produced when said landing flaps are extended, said apparatus comprising at least one controllable auxiliary flap operable as a counter vortex generator (9, 10) secured to at least one wing in a mounting area (MA) of a fixed wing portion of at least one of said aircraft wings (3, 4) and relative to at least one of said trailing edge landing flaps (7, 8) for generating a controlled counter vortex for counteracting a respective trailing vortex of said trailing vortices (11, 12) downstream of a respective wing, wherein said mounting area (MA) of said at least one controllable auxiliary flap operable as a vortex generator (9, 16) has a length in either wing direction away from a wing chord (EL) passing through said outer end (7A, 8A) of a respective landing flap of said landing flaps (7, 8), said length of said mounting area (MA) corresponding to 10% of one half said given span width of said aircraft, whereby said at least one auxiliary flap is so positioned that said controlled counter vortex is injected into said respective trailing vortex to vibrate said respective trailing vortex thereby dissipating said respective trailing vortex at least partially.

2. The apparatus of claim 1, wherein said auxiliary flap has a journal or hinge axis (9') extending in said mounting area (MA) perpendicularly to said central longitudinal aircraft axis (CA).

3. The apparatus of claim 1, comprising at least one said auxiliary flap (9, 10) for each wing, each said at least one auxiliary flap comprising a journal or hinge (9') securing said auxiliary flap to said wing in said mounting area (MA) having a mounting area center on said wing chord (EL) at said outer end of said respective trailing edge landing flap, said mounting area having a total length in a wing direction corresponding to 20% of one half of said given span width in either direction away from said wing chord (EL), said mounting area (MA) having a forward border at about 60% of said wing chord (EL) and a rearward border at about 80% of said wing chord (EL), said apparatus further comprising drive means operatively connected to said at least one auxiliary flap for each wing for moving said at least one auxiliary flap on each wing between a rest position recessed in said wing and an active position projecting out of said wing for generating said controlled counter vortex during slow flight.

4. The apparatus of claim 1, wherein said at least one auxiliary flap has an angle of attack relative to a top surface of said wing of 30° at the most.

5. The apparatus of claim 4, wherein said angle of attack of said at least one auxiliary flap is within an angular range of 12° to 25°.

6. The apparatus of claim 1, wherein said at least one auxiliary flap has a shape of at least part of a delta wing, said delta wing having a first leading edge with a sweep of about 60° and a second straight edge, and wherein said first leading edge is a right-hand edge or a left-hand edge as viewed in a flight direction.

7. The apparatus of claim 1, wherein said at least one auxiliary flap has a delta wing shape with first and second leading edges each having a sweep of about 60°.

8. The apparatus of claim 1, wherein said at least one auxiliary flap has a shape of at least part of a delta wing with at least one swept leading edge and a straight trailing edge.

9. The apparatus of claim 8, wherein said swept leading edge is a sharpened edge (SE).

10. An aircraft having a given span width, said aircraft comprising an apparatus for reducing trailing vortices generated by wing components including lift producing trailing edge landing flaps of said aircraft, said apparatus comprising at least one controllable vortex generator (9, 10) on each wing for generating a controlled counter vortex, said at least one controllable vortex generator (9, 10) being secured to its respective wing in a mounting area (MA) having a mounting area center on a chord line (EL) passing through an outer end of each of said trailing edge landing flaps, said mounting area extending away from said mounting area center in a wing direction toward a respective wing tip and toward an aircraft body, said mounting area having such a length in said wing direction that said at least one controllable vortex generator (9, 10) of each wing is positionable on either side of said chord line (EL) on a fixed wing portion in said mounting area (MA) for vibrating a respective trailing vortex with said controlled counter vortex to thereby dissipate said respective trailing vortex at least partially, said aircraft further comprising drive means for operating said at least one controllable vortex generator for each wing, and wherein said at least one controllable vortex generator of one wing is arranged symmetrically to the at least one controllable vortex generator of the other wing of said aircraft relative to a longitudinal axis (CA) of said aircraft.

11. The aircraft of claim 10, wherein said drive means operate said at least one controllable vortex generator for each wing into an extended stationary position during slow flight and back into a rest position recessed in said wing during normal flight.

12. The aircraft of claim 10, wherein during slow flight said drive means repeatedly operate said at least one controllable vortex generator for each wing dynamically back and forth between an extended vortex generating position and a recessed rest position, whereby both controllable vortex generators are operated synchronously with each other and are positioned symmetrically relative to said central longitudinal axis (CA) of said aircraft.

13. The aircraft of claim 1, wherein during slow flight said drive means repeatedly operate said at least one controllable vortex generator for each wing dynamically back and forth between an extended vortex generating position and a recessed rest position, wherein both controllable vortex generators are positioned symmetrically relative to said central longitudinal axis, and wherein both controllable vortex generators are operated non-symmetrically so that during slow flight one controllable vortex generator is in a recessed rest position while the other controllable vortex generator is in a vortex generating extended position and vice versa.

14. The aircraft of claim 10, wherein said length of said mounting area (MA) in said wing direction is a total length on both sides of said chord line (EL), said total length corresponding to 20% of one half of said given span width.

15. A method for reducing trailing vortices downstream of an aircraft wing, said method comprising the following steps:
(a) generating with an auxiliary flap for each wing a counteracting controllable vortex for at least one of said trailing vortices of each wing,
(b) imposing said counteracting controllable vortex on a respective trailing vortex for at least partially dissipating said respective trailing vortex, and
(c) operating said auxiliary flap of one wing in synchronism with the auxiliary flap of the other wing so that both flaps are extended simultaneously during slow flight and recessed during normal flight.

16. The method of claim 15, wherein said operating of said auxiliary flap of one wing in synchronism with the operation of the other auxiliary flap is performed so that during slow flight both auxiliary flaps are extended or recessed simultaneously, and so that during normal flight both auxiliary flaps are recessed in the respective wing.

17. A method for reducing trailing vortices downstream of an aircraft wing, said method comprising the following steps:
(a) generating with an auxiliary flap for each wing a counteracting controllable vortex for at least one of said trailing vortices of each wing,
(b) imposing said counteracting controllable vortex on a respective trailing vortex for at least partially dissipating said respective trailing vortex, and
(c) operating said auxiliary flap of one wing in opposition to the operation of the other auxiliary flap so that during slow flight one auxiliary flap is extended while the other auxiliary flap is recessed and vice versa, and so that during normal flight both auxiliary flaps are recessed in the respective wing.

* * * * *

UNITED STATES PATENT AND TRADEMARK OFFICE
CERTIFICATE OF CORRECTION

PATENT NO.    : 6,513,761 B2
DATED         : February 4, 2003
INVENTOR(S)   : Huenecke It is certified that error appears in the above-identified patent and that said Letters Patent is hereby corrected as shown below:

Title page,
Item [56], References Cited, U.S. PATENT DOCUMENTS, "6,042,059", after "Bilanin" insert -- et al. --.

Column 1,
Line 9, after "Aircraft", replace "Wina" by -- Wing --.

Column 10,
Line 16, after "of", replace "claim 1" by -- claim 10 --.

Signed and Sealed this

Twenty-seventh Day of May, 2003

JAMES E. ROGAN
*Director of the United States Patent and Trademark Office*